March 23, 1965  C. E. GROSS  3,174,778
FITTING FOR TUBES
Filed May 17, 1962

INVENTOR.
CLARENCE E. GROSS
BY
ATTORNEYS

United States Patent Office 3,174,778
Patented Mar. 23, 1965

3,174,778
FITTING FOR TUBES
Clarence E. Gross, Cleveland, Ohio, assignor to Curtis Manufacturing Company, a corporation of Missouri
Filed May 17, 1962, Ser. No. 196,046
6 Claims. (Cl. 285—341)

My invention relates to fittings or couplings such as used for connecting metal tubing or the like to cylinders, conduits, or other devices.

This invention constitutes an improvement upon the invention covered by my copending United States Patent application Serial No. 123,693, filed July 13, 1961, and this application is a continuation-in-part of said application Serial No. 123,693, now abandoned.

An object of my invention is to provide an improved fitting having unique features useful for making a good connection to a tube.

Another object is the provision for firmly locking a tube against withdrawal from the fitting and maintaining a good sealing engagement with the tube.

Another object is the provision for a fitting having an improved sleeve incorporated in the fitting which gives superior results in embracing and holding a tube in the fitting.

Another object is the provision of a tubular sleeve in an improved fitting, which sleeve may be reversed in the fitting so as to have equivalent relationship with other parts of the fitting regardless of which alternate disposition of the sleeve is utilized.

Another object is the provision of an improved structure in such a fitting which provides sealing engagement with the tube in addition to that previously obtained.

Another object is the provision for providing three sealing engagements between a sleeve member of the fitting assembly and the tube.

Another object is the provision of means for obtaining a sealing and locking interengagement between tube and the sleeve member of the fitting assembly at the location of the flange portion of the sleeve member.

Another object is the provision for proportioning the strengths of portions of a sleeve member of a fitting assembly to obtain a new and unexpected result.

Another object is to provide for a novel combination of parts producing improved results in a novel and useful manner.

Another object is the provision for firmly holding and sealingly gripping the tube by a new combination of structural features in a fitting.

Other objects and a fuller understanding of the invention may be had by referring to the following description and claims, taken in conjunction with the accompanying drawings, in which:

Figure 1:
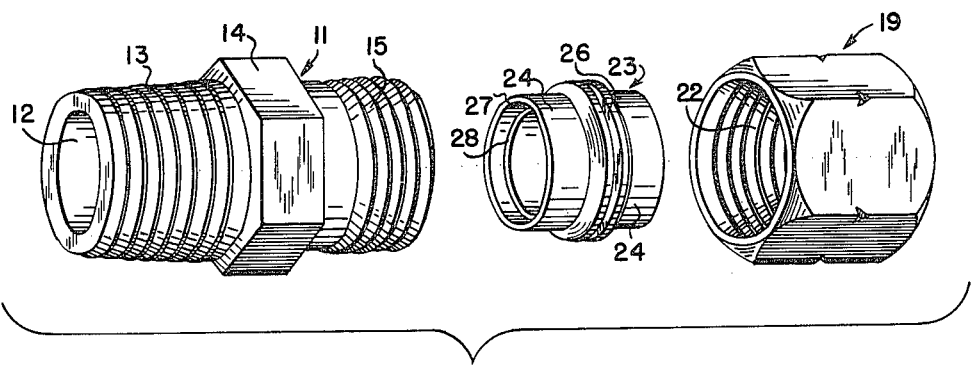
FIGURE 1 is an exploded view of the improved fitting showing the separated parts of the fitting in perspective.
Figure 2:
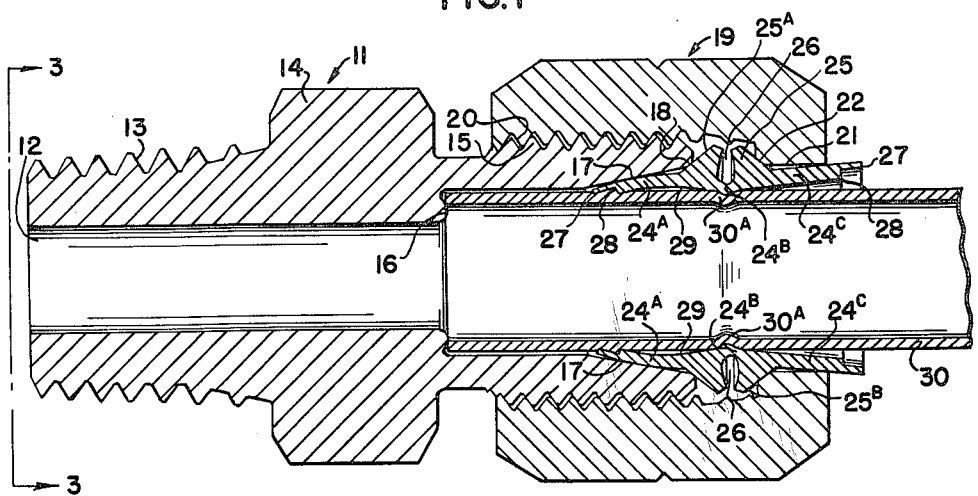
FIGURE 2 is an enlarged longitudinal sectional view taken through the improved fitting and showing the relationship of the parts in holding and gripping a tube inserted in the fitting.
Figure 3:
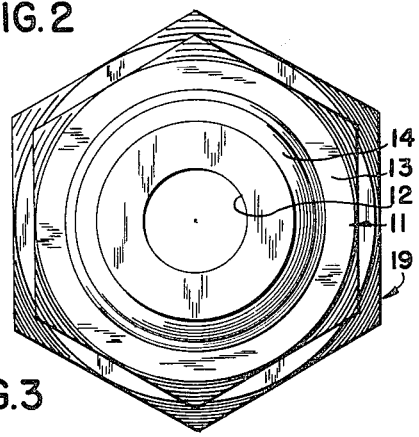
FIGURE 3 is an endwise view looking in the direction of the arrows 3—3 of FIGURE 2.

My fitting embodies a connector body indicated generally by the reference character 11, a tubular sleeve indicated by the reference character 23, and a nut indicated by the reference character 19. The connector body 11 has a bore or opening 12 extending axially therethrough. The forward end of the connector body 11 has a portion 13 upon which a pipe thread is formed. This threaded end portion 13 is adapted to be threadably connected to a cylinder, a conduit, or other device with which a tube is to be placed in communication. There is a hexagonal portion 14 provided for engaging a wrench, for the purpose of turning the connector body when connecting or disconnecting the same. The rearward end of the connector body 11, that is, its end to the right in FIGURES 1 and 2, is provided with a straight threaded portion 15. This threaded portion 15 is adapted to complementarily engage with the internally threaded portion 20 of the hollow nut 19. By turning the nut 19 in an opposite rotative direction, the nut 19 moves away from the connector body, that is, toward the right in FIGURES 1 and 2.

Within the bore 12 of the connector body 11 there is provided an annular shoulder 16 extending therearound and which shoulder is formed by an enlargement of the bore 12 as seen in the drawing. At the entrance of the enlarged bore of the connector body there is a tapered or sloping wall 17. The angle of the taper of the tapered wall 17 is on the general order of about ten degrees to the longitudinal axis of the connector body 11. As seen in the drawing, the tapered wall 17 extends from adjacent the rearward or righthand end of the connector body about halfway of the distance to the annular shoulder 16. At the righthand end of the connector body 11, that is, at its rearward end, there is a short chamfered wall 18 leading to the tapered wall 17.

The portion of the bore of the connector body 11 defined by the tapered wall 17 provides an entrance portion of the bore. The tube 30 and sleeve member 23, in being moved axially into the connector body 11, first goes through the short chamfered portion 18, then through the entrance defined by the tapered wall 17 and thence to the position illustrated in FIGURE 2 wherein the tube 30 has moved forwardly to where the forward terminus of the tube 30 engages the shoulder 16. As seen in FIGURE 2, the shoulder 16 is somewhat undercut so that the end of the tube is held radially outward by the shoulder 16 rather than being compressed inward.

The rearward end of the nut 19, that is, its end on the right hand in FIGURE 2, is provided with a bore 21, which bore extends axially through the nut 19. There is provided in the bore of the nut an annular internal shoulder 22 which is chamfered at approximately 45 degrees to the axis of the nut, as seen in the drawing. The bore forwardly of the shoulder 22 is enlarged and is defined by the internal threaded portion 20.

The tubular sleeve member 23 embodied in my new fitting has a cylindrical portion 24. Equidistant of the ends of the sleeve member 23 and extending therearound there is an annular bead or flange portion 25. Provided in the bead or flange 25 is an annular groove 26 which extends around the bead 25. The groove extends radially inward from the maximum circumference of the sleeve member at the bead 25 and toward the inner wall of the sleeve member to a point where the outside diameter of the sleeve member taken within the groove 26 is less than the outside diameter cylindrical portion of the sleeve 23 at locations toward the opposite ends thereof from the bead 25.

The side of the flange portion 25 which is directed to meet the chamfered surface 18 has been designated by the reference character 25A. The side of the flange 25 which is directed to be engaged by the chamfered shoulder 22 of the nut member 19 is designated by the reference character 25B. Sides 25A and 25B are inclined toward each other and are disposed at about 45 degrees to the axis of the sleeve member, as shown. The inclination of side 25A complements the inclination of surface 18 and the inclination of side 25B complements the inclination of shoulder 22. By reason of the described angular disposition of the parts, axially directed force on flange 25 by axially opposed surfaces 18 and 22, when the nut member 19 is turned down on the body 11, produces a component of force radially inward as well as axial. This tends to tilt halves of the flange portion 25, divided by groove 26, so as to partially close the groove 26. This aids in obtaining the distortion of the sleeve member from its normal undistorted condition shown in FIGURE 4 to the distorted condition shown in FIGURE 2.

The thickness of the wall of the metal sleeve member 23 in the plane of the groove 26 is less than the thickness of the wall of the sleeve member 23 at locations intermediate of, and substantially equidistant from, the flange portion 25 and the opposite ends of the sleeve member, so that the sleeve member is substantially weaker and more distortable at or in the neighborhood of the groove 26 than it is between the flange portion 25 and its opposite ends. The difference in thickness may be on the order of .008 inch in one size of sleeve member, but this will vary with the size of sleeve member. It does not require a great difference in the thicknesses to make the sleeve member radially inward of the groove relatively weak and more easily distorted and upset by the forces imposed on the sleeve member 23 by the nut member 19 and body 11 in cooperation with each other. The location of greater weakness at the groove 26 is designated by the reference character 24B. The portions of greater strength intermediate the flange portion 25 and the opposite ends have been designated by the reference characters 24A and 24C, respectively.

There is a relatively sharp corner 27 at the juncture of each end of the tubular sleeve 23 and the internal wall thereof, this sharp corner 27 being annular in form. The opposite ends of the tubular member 23 are undercut or relieved at the inner wall so as to provide an additional annular sharp corner 28 spaced axially inward from the sharp corner 27 at each end of the sleeve member.

It is to be noted that the sleeve member 23, in an uncompressed and non-distorted condition, is symmetrical in that the half to the right of the center of the groove 26 is exactly the same as the half to the left of the center of the groove 26. Both ends of the sleeve member 23 are the same so that it does not matter which end of the sleeve member 23 is inserted into the connector body 11 and inwardly of the entrance defined by the tapered wall 17. The relationship of the parts and their coaction will be the same regardless of which end is inserted first into the connector body. Thus mistakes cannot be made by the person assembling the fitting because opposite end portions of sleeve member 23 are equivalent and the same coaction and relationship of the parts is obtained regardless of whether the righthand end or the lefthand end of the tubular fitting shown in FIGURE 4 should be inserted into the connector body 11 to engage the tapered wall 17.

The dimensions of the sleeve member 23 and of the connector body 11 are so proportioned that the forward inserted end of the sleeve member 23 meets, and is compressed by, the tapered wall 17 substantially concurrently with the meeting of the chamfered portion 18 by the side 25A of the flange portion 25 of sleeve member 23. Thus, the forward inserted end of the sleeve member 23 is inclined radially inward substantially simultaneously with the tilting of the side 25A axially and radially inward by the opposition offered by chamfered portion 18 as the sleeve member 23 is pressed toward the body 11 by the nut member 19. This action tends to close the groove 26, to buckle outwardly the portion 24A of the cylindrical wall, and to distort and offset the portion 24B to tightly press and indent the tube 30 radially inward of the groove 26 to form annular indentation 30A, as illustrated in FIGURE 2, upon the turning down of the nut member 19 on the body 11. This action also includes the flaring outwardly of the portion 24C of the sleeve member 23 as shown in FIGURE 2, which provides a gradual or inclined support for the tube 30 upon any bending of the tube relative to the axis of the nut member 19 and thus to minimize any sharp or angular corners met by the tube 30 as it emerges from the fitting with consequent lessening of breakage or denting of the tube by any lateral movement relative to the fitting.

To assemble the fitting, the sleeve member 23 is moved axially into the nut 19 to where the side 25B of the flange 25 engages the shoulder 22 of the nut 19. A tube 30, such as a copper, brass, or aluminum tube, is axially moved into the sleeve member 23, such as from the right in FIGURE 2, so that the tube extends somewhat beyond the forward end of the sleeve member 23. The nut 19 is then assembled to the connector body 11 by threadably engaging a threaded portion 15 with the threaded portion 20. At the same time, the tube 30 is pushed forward, the tube having a sliding fit with the sleeve member 23, to position the terminus of the tube 30 adjacent to the shoulder 16. By turning the nut 19 so as to move the nut 19 toward the connector body 11, the shoulder 22 presses the sleeve member 23 forwardly toward the connector body 11 and thus presses the inserted cylindrical portion 24 of the sleeve member 23 against the tapered wall 17.

Substantially simultaneously with the pressing of the inserted cylindrical portion 24 against the tapered wall 17, the side 25A of the flange portion 25 is pressed against the chamfered surface 18, by reason of the relative dimensions of the parts.

By a camming action the tapered wall 17 radially compresses the inserted forward end of the cylindrical portion 24 of the sleeve member 23 so as to force the annular corners 27 and 28 radially inward into the tube 30 so as to bite into the metal of the tube 30 and to sealingly engage with the tube 30 around the annular extent of the two spaced corners 27 and 28. By reason of the angular disposition of the annular corners 27 and 28, the tube 30 is locked against withdrawal from the connector body 11. Also a fluid tight engagement is made where corners 27 and 28 bite into and partially displace metal of the tube 30 at the location of the annular corners 27 and 28.

At the same time that the forward inserted end of the sleeve member 23 is forced inward upon the tube, the sleeve member is upset at location 24B of the cylindrical portion at the groove 26. The tilting of the sides of the flange portion 25 and the relative weakness of the portion 24B causes portion 24B to be displaced or upset so as to move radially inward to indent the tube 30 and form annular indentation 30A.

Thus, there are formed three annular sealing engagements between sleeve member 23 and tube 30, these being formed by annular sharp corners 27 and 28 at the inserted end of the sleeve member 23 and by the upset portion 24B radially inward of the groove 26. The addition of this tight sealing interengagement between upset portion 24B and indentation 30A provides a marked improvement over other arrangements. The resulting flaring outward of the rearward end of the sleeve member protruding from the nut member produces another highly beneficial result from the combination of features shown.

The sleeve member 23 is made of a suitable heat-treated steel alloy. It is strong and resists cracking under the pressure to which it is subjected by the described camming action and yet is yieldable enough at its thin end portion as to be radially compressible to the required degree. The degree of radial compression at the inserted forward end of the sleeve member need not be great in order to obtain the required amount of biting into the tube and good sealing engagement therewith.

By reason of the camming action obtained by the forward cylindrical portion 24A of the sleeve member 23 meeting the tapered wall 17, there is some distortion of the sleeve member 23. The cylindrical portion 24A within the tapered wall 17 buckles or expands somewhat at the point indicated by the reference character 29. This buckle portion 29 tends to move radially outward against the tapered wall 17 and away from the tube 30 as illustrated in the drawing. At the same time, the bead or flange 25 is longitudinally compressed between the internal shoulder 22 of the nut and the chamfered end wall 18 of the connector body 11. By reason of the greater mass of metal at the bead or flange 25, the sleeve member 23, if not provided with groove 26, would tend to resist the buckling at 29 and hence to resist the described compression of the sleeve. The bead or flange 25 is required for engagement with the shoulder 22 in order to press the sleeve member 23 longitudinally inwardly against the resistance offered by the tapered wall 17. Without the groove 26, the bead or flange 25 would so resist distortion of the sleeve member 23 that it would be difficult to compress the corners 27 and 28 radially inward and to buckle out the sleeve member at 29. However, by providing the annular groove 26 within the bead or flange 25 equidistantly from the opposite ends of the sleeve member 23, this stiffening or resistance to compression which would otherwise be obtained from the bead or flange 25 is reduced so that the sleeve member 23 may assume the form illustrated in FIGURE 2.

Figure 4:
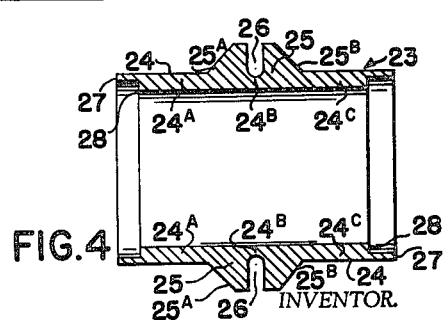
FIGURE 4 is a longitudinal sectional view of the improved tubular sleeve utilized in my improved fitting and shown removed from the other parts of the fitting.

As the sleeve member 23 is symmetrical, either end may be inserted into the body 11. Upon the distortion of the sleeve member 23 by the nut member 19 coacting with the body 11, the sleeve member normally as shown in FIGURE 4 assumes the shape shown in FIGURE 2. There are the three sealing engagements provided between sleeve member and tube and also the support of the tube by the sleeve member and the gradual flaring out of the sleeve member away from the tube as it extends from the nut member as illustrated in FIGURE 2.

It is thus seen that by my improved combination of structural features, a tube, such as a tube of brass, copper, or aluminum, may be efficiently seized and held and a good sealing engagement provided therewith. By reason of the double-ended arrangement of the sleeve member, assurance is given that a proper assembly of the fitting will be made regardless of the choice of the end of the sleeve member which is inserted into the connector body.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of the parts may be resorted to without departing from the spirit and scope of the invention as hereinafter claimed.

What is claimed is:

1. A fitting for connection to a tube comprising in combination, a body member, a sleeve member and a nut member having aligned bores for receiving a tube therein, the bore of the body member having an inwardly tapered wall for engaging a first end portion of the sleeve member and the bore of the nut member having a wall surrounding an opposite end portion of the sleeve member, said body member and nut member being complementarily threaded to permit the nut member to be threadably turned down relative to the body member and to compress the sleeve member therebetween in an axial direction, said sleeve member having an annular flange portion extending therearound substantially equidistantly from the opposite ends of the sleeve member and cylindrical portions extending in opposite axial directions from said flange portion, the opposite ends of the sleeve member having cutting edge portions, respectively, for bitingly engaging the tube upon compression upon the tube, said flange portion having axially spaced sides inclined toward each other from said cylindrical portions at locations axially spaced from said opposite ends, respectively, said flange portion having an annular groove extending therearound intermediate said sides and extending from the circumferential periphery of the flange portion radially inward thereof, the depth of said groove being such that the thickness of the wall of the sleeve member in the plane of said groove disposed normal to the axis of the sleeve member is less than the thickness of the wall of the sleeve member in transverse planes disposed normal to said axis through said cylindrical portions, respectively, at locations substantially equidistant of said flange portion and of the opposite ends of said sleeve member to weaken the sleeve member at the location of said groove, said body member and said nut member having spaced opposing surfaces inclined toward each other in general conformity to the inclination of the opposite sides of said flange portion and in axial alignment with each other, said spaced opposing surfaces engaging adjacent of the said opposite sides of said flange portion and compressing the flange portion therebetween to tilt the said axially spaced sides toward each other upon tightening down of the nut member on the body member, said tapered wall of the body member extending radially from the bore thereof a sufficient distance to provide an annular space around said sleeve member at a location intermediate said flange portion and said first end portion of the sleeve member, said tapered wall having a greater inner diameter than the outer diameter of the cylindrical portion of the sleeve member at said location before compression, the dimensions of the body member and sleeve member being such that the inwardly tapered wall of the body member is engaged by the inserted end of the sleeve member substantially concurrently upon engagement of the said inclined surface of the body member by an inclined side of the flange portion, whereby the cylindrical portion in the bore of the body member is buckled radially outwardly toward said tapered wall of the said body member for facilitating the biting engagement of said first end portion of the sleeve member with said tube, and the biting edge portion thereof is compressed into biting engagement with a tube therein and substantially simultaneously the sleeve member inwardly of said groove is upset by the compression of the flange portion by said inclined opposing surfaces to press inwardly on the tube radially inward of the groove.

2. A fitting as claimed in claim 1 and in which the bore of the nut member has a greater inner diameter than the outer diameter of the cylindrical portion of the sleeve member at a second location intermediate said flange portion and the other of said opposite ends to permit the cylindrical portion at said second location to flare outwardly at said location toward said nut member.

3. In a tube fitting having a body member, a nut member and a sleeve member disposed about the tube between the body member and nut member to grasp the tube upon the nut member being threadably turned up on the body member to compress the sleeve member therebetween, the improvement of the sleeve member having a flange portion disposed intermediate its inner end and outer end, a cylindrical portion intermediate the flange portion and the respective said ends, the flange portion having an annular groove extending therearound and having a depth leaving a wall inwardly of said groove of less thickness than that of the cylindrical portion on opposite sides of the flange portion to provide relative weakness of the wall in the plane of said groove, the body member at a location spaced axially along the sleeve member between the flange portion and inner end of the sleeve member being radially spaced outwardly a distance substantially greater than the thickness of the wall of the cylindrical portion to provide space for radial displacement of the cylindrical portion at that location, the body member, nut member and sleeve member being relatively dimensioned and arranged to provide that the body member and nut member have opposing surfaces spaced radially outwardly from the cylindrical portion to engage opposite sides of the flange portion at positions spaced from said cylindrical portion, one of each pair of interengaged surfaces and flange sides being inclined toward said annular groove, and that upon the nut member being threadably turned up on the body member, the inner end of the sleeve member is pressed radially inward against the tube and substantially simultaneously the flange portion is compressed by radially and axially directed forces exerted by the said opposing surfaces of the body member and nut member on opposite axial sides of the flange portion at said radially spaced positions to cammingly tilt the flange portion into said groove whereby the cylindrical portion of the sleeve member is buckled radially outward toward the body member at said location between the flange portion and the inner end of the sleeve member, and the weakened wall of the sleeve member at the plane of said groove is upset radially inward against said tube.

4. A tube fitting as claimed in claim 3 and in which the nut member at a location spaced axially along the sleeve member at a location toward the opposite end of the sleeve member toward the flange portion is radially spaced outwardly a distance substantially greater than the thickness of the wall of the cylindrical portion to provide for radial displacement of the cylindrical portion at that location whereby upon the said threadable turning of the nut member up on the body member the cylindrical portion of the sleeve member is also flared outwardly toward said nut member in extending from the flange portion to said opposite end.

5. A fitting for connection to a tube comprising in combination, a body member, a sleeve member and a nut member having aligned bores for receiving a tube therein, the bore of the body member having an inwardly tapered wall for engaging a first end portion of the sleeve member and the bore of the nut member having a wall surrounding an opposite end portion of the sleeve member, said body member and nut member being complementarily threaded to permit the nut member to be threadably turned down relative to the body member and to compress the sleeve member therebetween in an axial direction, said sleeve member having an annular flange portion extending therearound substantially equidistantly from the opposite ends of the sleeve member and cylindrical portions extending in opposite axial directions from said flange portion, the opposite ends of the sleeve member having cutting edge portions, respectively for bitingly engaging the tube upon compression upon the tube, said flange portion having axially spaced sides inclined toward each other from said cylindrical portions at locations axially spaced from said opposite ends, respectively, said flange portion having an annular groove extending therearound intermediate said sides and extending from the circumferential periphery of the flange portion radially inward thereof, the depth of said groove being such that the thickness of the wall of the sleeve member in the plane of said groove disposed normal to the axis of the sleeve member is less than the thickness of the wall of the sleeve member in transverse planes disposed normal to said axis through said cylindrical portions, respectively, at locations substantially equidistant of said flange portion and of the opposite ends of said sleeve member to weaken the sleeve member at the location of said groove, said body member and said nut member having spaced opposing surfaces adjacent said opposite sides of said flange portion, said opposing surfaces being spaced radially outwardly from said cylindrical portion of the sleeve member to impart both radially inward and axially directed components of force upon being pressed against opposite sides of the flange portion, said opposing surfaces compressing the flange portion therebetween to tilt the said axially spaced sides toward each other upon tightening down of the nut member on the body member, the bore of said body member being relieved radially outwardly of the sleeve member intermediate said flange portion and the inserted end of the sleeve member to provide room permitting the sleeve member to buckle radially outwardly between said flange portion and said inserted end, the dimensions of the body member and sleeve member being such that the inwardly tapered wall of the body member is engaged by the inserted end of the sleeve member substantially concurrently upon engagement of the said opposing surface of the body member by an inclined side of the flange portion, whereby the cylindrical portion in the bore of the body member is buckled radially outwardly toward the relieved bore wall of the said body member for facilitating the biting engagement of said first end portion of the sleeve member with said tube, and the biting edge portion thereof is compressed into biting engagement with a tube therein and substantially simultaneously the sleeve member inwardly of said groove is upset by the compression of the flange portion by said opposing surfaces to press inwardly on the tube radially inward of the groove.

6. A tube fitting as claimed in claim 5 and in which the nut member is relieved outwardly of the sleeve member at an axial distance from the flange portion to permit the sleeve member to flare radially outwardly toward the nut member upon said tilting of the flange portion.

References Cited in the file of this patent
UNITED STATES PATENTS

| | | |
|---|---|---|
| 2,123,999 | Lauer | July 19, 1938 |
| 2,201,404 | Kreidel | May 21, 1940 |
| 2,333,470 | Cowles | Nov. 2, 1943 |
| 2,341,970 | Worel | Feb. 15, 1944 |
| 2,473,119 | Wolfram | June 14, 1949 |
| 2,761,704 | Crawford | Sept. 4, 1956 |
| 3,055,684 | Currie | Sept. 25, 1962 |
| 3,075,793 | Lennon | Jan. 29, 1963 |
| 3,112,940 | Crawford | Dec. 3, 1963 |